United States Patent
Dirks et al.

(10) Patent No.: US 11,347,497 B1
(45) Date of Patent: May 31, 2022

(54) UNIFORM SOFTWARE AND FIRMWARE MANAGEMENT OF CLUSTERS OF HETEROGENEOUS SERVER HARDWARE

(71) Applicant: VMware, Inc., Palo Alto, CA (US)

(72) Inventors: Patrick William Penzias Dirks, Monte Sereno, CA (US); Naga Ullas Vankayala Harinathagupta, Santa Clara, CA (US); Mukund Gunti, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/141,787

(22) Filed: Jan. 5, 2021

(51) Int. Cl.
*G06F 8/65* (2018.01)
*G06F 9/455* (2018.01)
*G06F 9/54* (2006.01)

(52) U.S. Cl.
CPC ............ *G06F 8/65* (2013.01); *G06F 9/45558* (2013.01); *G06F 9/547* (2013.01); *G06F 2009/4557* (2013.01); *G06F 2009/45579* (2013.01); *G06F 2009/45595* (2013.01)

(58) Field of Classification Search
CPC ........ G06F 8/65; G06F 9/45558; G06F 9/547; G06F 2009/4557; G06F 2009/45579; G06F 2009/45595
See application file for complete search history.

(56) References Cited

U.S. PATENT DOCUMENTS

| | | | | |
|---|---|---|---|---|
| 9,176,752 | B1* | 11/2015 | Marr | ...................... H04L 9/0877 |
| 2012/0254865 | A1* | 10/2012 | Saeki | .................. G06F 9/45533 |
| | | | | 718/1 |
| 2018/0203715 | A1* | 7/2018 | Granado | ............. G06F 9/45558 |
| 2018/0239896 | A1* | 8/2018 | Kato | ..................... G06F 9/45558 |
| 2019/0317750 | A1* | 10/2019 | Ramsay | ............. G06F 9/45558 |

OTHER PUBLICATIONS

U.S. Appl. No. 16/939,117, filed Jul. 27, 2020, 27 pages.

* cited by examiner

*Primary Examiner* — Phillip H Nguyen
(74) *Attorney, Agent, or Firm* — Kim & Stewart LLP

(57) ABSTRACT

A method of upgrading an image of a virtualization software and firmware in a plurality of hosts having hardware supported by multiple hardware support managers including first and second hardware support managers, includes generating a software specification that specifies a desired state of the virtualization software and a desired state of first firmware for first hardware supported by the first hardware support manager and second firmware for second hardware supported by the second hardware support manager, preparing a desired image of the virtualization software that includes software components of the desired state of the first and second firmware, and coordinating an upgrade by (1) instructing the first and second hardware support managers to upgrade the hosts to the desired state of the first and second firmware, and (2) instructing each of the hosts to upgrade to the desired image of the virtualization software.

20 Claims, 10 Drawing Sheets

UNIFORM SOFTWARE AND FIRMWARE MANAGEMENT OF CLUSTERS OF HETEROGENEOUS SERVER HARDWARE

BACKGROUND

In many virtualization computing systems, virtualization software is installed on a cluster of hosts using an ISO image that is created from a flat list of software installation bundles (SIBs). An SIB is the smallest unit of software that can be shipped and installed, and these SIBs make up, for example, a base hypervisor image (hereinafter also referred to as "base image") from a virtualization software provider, as well as drivers, agents, and other software components from an OEM (original equipment manufacturer) and other vendors of hardware. In a typical installation, hundreds of these SIBs are packaged as one or more ISO images and installed in the hosts.

After installation, lifecycle management of the virtualization software becomes cumbersome and error-prone for several reasons. First, although different software developers create new versions or updates to the SIBs, the new versions or updates cannot be released independently. The releases have to be tightly controlled because it is likely that one SIB has a dependency to another SIB. As a result, new releases are made in the form of bulletins, which are a collection of software installation bundles, or as a new ISO image in which new SIBs from the virtualization software provider, the OEM, and other software vendors are packaged. Because of the inter-dependencies and the integration of the newly developed SIBs with other SIBs, it is difficult to make piecemeal changes to the virtualization software for easy consumption by an end user during the lifecycle of the virtualization software.

Furthermore, new releases come in many different forms. A complete release, e.g., a GA (general availability) release, may be made with an ISO image or a bulletin. The bulletin may be employed for partial releases as well, including rollup, patch, update, and extension. Very few end users understand the differences among these different types of partial releases and there are no clear rules that establish when and how a bulletin should be created for a particular type of release.

Consequently, over time, changes to the virtualization software are layered on top of each other and the final image of the virtualization software is not easily captured or described. Worse, history becomes a factor in that past bulletins may have included other SIBs, not overridden in later bulletins. For these reasons, the overall content is difficult to capture or describe, and the end user is unable to answer the question, "What is the current state of the virtualization software configured in each of the hosts in the cluster?" As such, if there is a particular desired state of the virtualization software that the user is interested in, the end user will have no way of knowing whether the current state is compliant with the desired state and, if not, how to make the current state compliant with the desired state.

SUMMARY

One or more embodiments provide a desired state model for managing the lifecycle of virtualization software. According to embodiments, components of virtualization software are grouped into release units that are each managed separately and are layered on top of each other in a standardized way so that developers can independently create and ship their software with proper naming and versioning for easy consumption by end users of the virtualization software.

In this desired state model, the virtualization software provider releases the base image which forms the foundation for everything. OEMs create add-ons that customize the base image for their servers. When the end user selects an OEM of the servers for hosting the virtualization software, the add-on for that OEM is layered on top of the base image. In addition, a firmware manifest is laid on top of the add-on. At the top are additional drivers and agents, e.g., those added in response to a user selection of solutions.

According to one embodiment, an image of a virtualization software and firmware are upgraded in a plurality of hosts having hardware that is supported by multiple hardware support managers including first and second hardware support managers. The method of upgrading includes in response to a user input, generating a software specification that specifies a desired state of the virtualization software and a desired state of first firmware for first hardware supported by the first hardware support manager and second firmware for second hardware supported by the second hardware support manager; based on the software specification, preparing a desired image of the virtualization software that includes software components of the desired state of the first firmware and the desired state of the second firmware; and from a virtual machine management server that is programmed to deploy virtual machines in the hosts, coordinating an upgrade to the desired state of the virtualization software and the desired state of the first and second firmware in the hosts by (1) instructing the first hardware support manager and the second hardware support managers to upgrade the hosts to the desired state of the first firmware and the desired state of the second firmware, respectively, and (2) instructing each of the hosts to upgrade to the desired image of the virtualization software.

Further embodiments include a non-transitory computer-readable storage medium comprising instructions that cause a computer system to carry out the above method, as well as a computer system configured to carry out the above method.

DETAILED DESCRIPTION

According to embodiments, SIBs, more generally referred to herein as payloads, are logically grouped into "components." In the embodiments, a component is a unit of shipment and installation, and a successful installation of a component typically will appear to the end user as enabling some specific feature. For example, if a software vendor wants to ship a user-visible feature that requires a plug-in, a driver, and a solution, the software vendor will create separate payloads for each of the plug-in, the driver, and the solution, and then group them together as one component. From the end user's perspective, it is sufficient to install this one component onto a server to enable this feature on the server. A component may be part of another software image, such as a base image or an add-on, as further described below, or it may be a stand-alone component provided by a third-party or the end user (hereinafter referred to as "user component").

A "base image" is a collection of components that are sufficient to boot up a server with the virtualization software. For example, the components for the base image includes a core kernel component and components for basic drivers and in-box drivers. The core kernel component is made up of a kernel payload and other payloads that have inter-dependencies with the kernel payload. According to embodiments, the collection of components that make up the base image is packaged and released as one unit.

An "add-on" or "add-on image" is a collection of components that the OEM wants to bring together to customize its servers. Using add-ons, the OEM can add, update or remove components that are present in the base image. The add-on is layered on top of the base image and the combination includes all the drivers and solutions that are necessary to customize, boot up and monitor the OEM's servers. Although an "add-on" is always layered on top of a base image, the add-on content and the base image content are not tied together. As a result, an OEM is able to independently manage the lifecycle of its releases. In addition, end users can update the add-on content and the base image content independently of each other.

"Solutions" are features that indirectly impact the desired image when they are enabled by the end user. In other words, the end-user decides to enable the solution in a user interface but does not decide what components to install. The solution's management layer decides the right set of components based on constraints. Examples solutions include HA (high availability), and NSX (network virtualization platform of VMware, Inc.).

Figure 1:
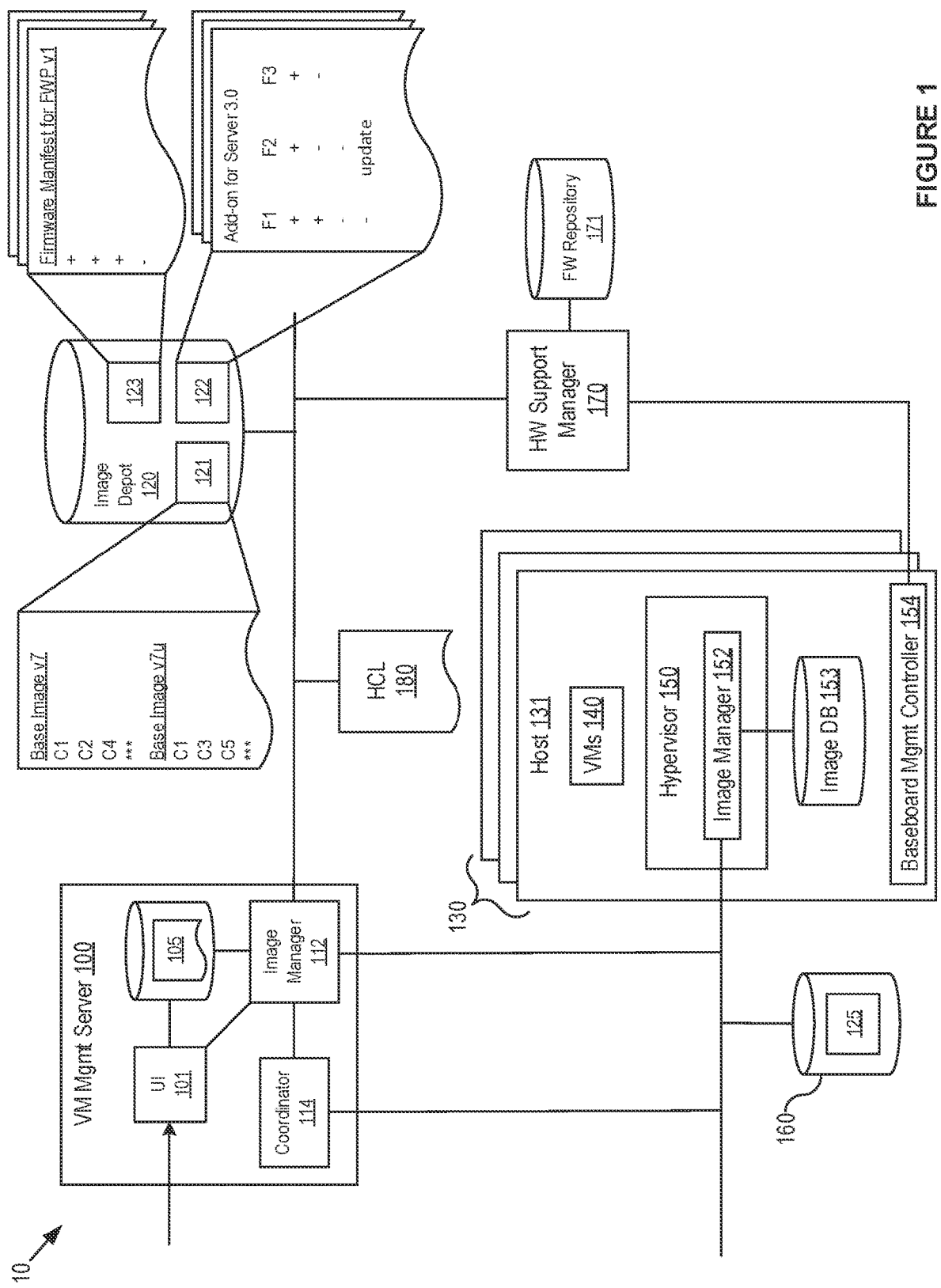
FIG. 1 is a block diagram of a virtualized computing system that implements a desired state model for managing the lifecycle of virtualization software according to embodiments.

FIG. 1 is a block diagram of a virtualized computing system 10 that implements a desired state model for managing the lifecycle of virtualization software according to embodiments. System 10 includes a cluster of hosts 131 which may be constructed on a server grade hardware platform such as an x86 architecture platform. The hardware platform includes one or more central processing units (CPUs), system memory, e.g., random access memory (RAM), and one or more network interface controllers (NICs). A virtualization software layer, also referred to herein as a hypervisor 150, is installed on top of the hardware platform. Hypervisor 150 supports a virtual machine execution space within which multiple VMs 140 may be concurrently instantiated and executed.

In the embodiment illustrated in FIG. 1, hosts 131 access shared storage 160 through their NICs. In another embodiment, each host 131 contains a host bus adapter (HBA) through which input/output operations (IOs) are sent to shared storage 160. Shared storage 160 may comprise, e.g., magnetic disks or flash memory in a storage area network (SAN). In some embodiments, hosts 131 also contain local storage devices (e.g., hard disk drives or solid-state drives), which may be aggregated and provisioned as a virtual SAN device.

VM management server 100 is a physical or virtual server that communicates with hypervisor 150 of each host 131 to provision VMs 140 from the hardware resources of host 131. VM management server 100 logically groups hosts 131 into a cluster 130 to provide cluster-level functions, such as load balancing across cluster 130 by performing VM migration between hosts 131, distributed power management, dynamic VM placement according to affinity and anti-affinity rules, and high-availability. The number of hosts 131 in the cluster may be one or many and three are depicted in FIG. 1.

In the desired state model according to embodiments, the end user expresses the desired state of the virtualization software (i.e., hypervisor 150) for the cluster of hosts through a UI 101 of VM management server 100. One example form for expressing the desired state is a software specification 105, which is generated based on selections made through UI 101. The selections that can be made through UI 101 include (1) base image, (2) add-on, (3) solution, (4) user component(s), and (5) firmware package (see FIG. 2). Image manager 112 consumes software specification 105 to composite a desired image that is modeled as a hierarchical software stack, including (1) the base image, which is the lowest layer of the software stack, (2) the add-on, which is layered on top of the base image, (3) firmware manifest corresponding to the selected firmware package in the layer above the add-on, and then on the top (4) solution drivers and agents and other user components.

In the embodiments, metadata and payloads of components, and metadata of base images, add-ons, firmware packages (in the form of a firmware manifest 123), components defined in firmware packages (hereinafter referred to a "firmware components"), and user components are placed in a data structure referred to as image depot 120. As depicted in FIG. 1, metadata 121 for base images include metadata for "Base image v7," which include components, C1, C2, C4, etc. and metadata for "Base Image v7u," which include components, C1, C3, C5, etc. FIG. 1 also depicts metadata 122 for add-ons for a family of servers, F1, F2, and F3, where the "+" symbols represent components being added to the base image and the "−" symbols represent components being deleted from the base image, while "update" represents a component in the base image that is being updated. As shown in metadata 122, for each family of servers, there can be different components that are added to, deleted from, and/or updated in the base image. Thus, different add-ons can have different dependencies. Firmware manifest 123 specifies components that are to be added on top of the base image and the add-on (depicted with a + symbol in FIG. 1) and components that are to be removed from the base image and the add-on (depicted with a − symbol in FIG. 1), so that drivers, agents, and other software components corresponding to the selected firmware package become part of the image of the virtualization software. In alternative embodiments, separate depots, e.g., in the form of file servers, are set up by OEMs to store metadata and payloads of components that the OEMs publish.

Figure 4:
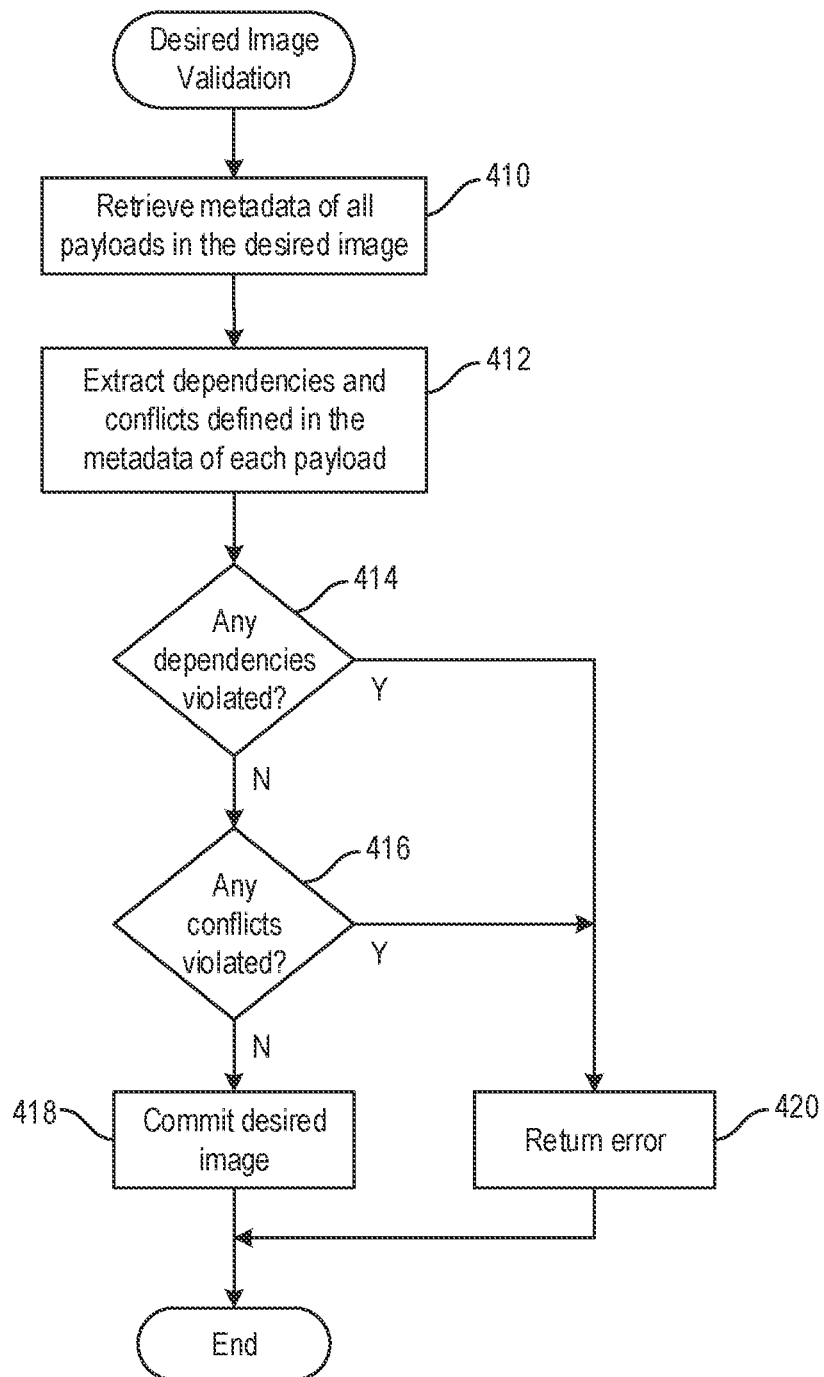
FIG. 4 is a flow diagram of steps carried out to perform validation of the desired image, according to an embodiment.

After image manager 112 composites the image of the virtualization software, image manager 112 validates the composited image in accordance with the method depicted in FIG. 4 and, if validated, stores the composited image in shared storage 160 as a desired image 125 that is to be installed in each host 131, and hands off control to coordinator 114. Coordinator 114 communicates with image manager 152 of each of hosts 131 through an API call to install desired image 125 in each of hosts 131. Once image manager 152 installs desired image 125, it stores the metadata of the installed image of the virtualization software in image database 153. Going forward, image database 153 of each host 131 operates as the single source of truth for the state of the virtualization software configured in that host, and will record any changes to the state of the virtualization software in image database 153.

Coordinator 114 also communicates with a hardware support manager 170 through an API call to install the firmware in hosts 131. In response to the API call, hardware support manager 170 retrieves the firmware from firmware repository 171 and stages the firmware in hosts 131. Then, the firmware staged in each host 131 is installed in the host by a corresponding baseboard management controller 154.

Hardware support manager 170 is a firmware management software running in a physical or a virtual server that exposes various APIs. The APIs include: (1) an "apply/remediate" API call to install in hosts 131 the firmware specified by the firmware manifest in desired image 125 or to remediate the firmware currently installed in hosts 131 to bring the firmware into compliance, (2) a "list" API to list all of the firmware packages that hardware support manager 170 is supporting, (3) a "scan" API to compare the current state of the firmware running in hosts 131 with the firmware specified by the firmware manifest in desired image 125, (4) a "firmware inventory" API to report a current state of the firmware running in hosts 131 or to provide a preview of what firmware will be installed based on the selected firmware package, (5) a "pre-check" API to confirm that it is possible to upgrade the firmware currently installed in hosts 131 to the firmware specified by the firmware manifest in desired image 125, and (6) a "stage" API to retrieve the firmware specified by the firmware manifest in desired image 125 and store them in a cache memory of hosts 131 for immediate installation upon receiving an apply or remediate API call. With these APIs, the end user is able to manage the image of the virtualization software installed in hosts 131 and the firmware installed in hosts 131 from a single "pane of glass," in this case, through UI 101 of VM management server 100.

Before desired image 125 is actually installed in hosts 131, image manager 112 performs a validation against a hardware compatibility list (HCL) 180. The goal of this validation, more specifically referred to herein as an HCL validation, is to make sure that desired image 125 which is going to be deployed in hosts 131 is compatible with the hardware devices in hosts 131. HCL 180 contains a list of all hardware devices installed in hosts 131, and identifies for each such hardware device all versions of device firmware and drivers that are compatible therewith. Validation is successful if the versions of the firmware and drivers in desired image 125 are listed in HCL 180 as compatible versions.

Figure 2:
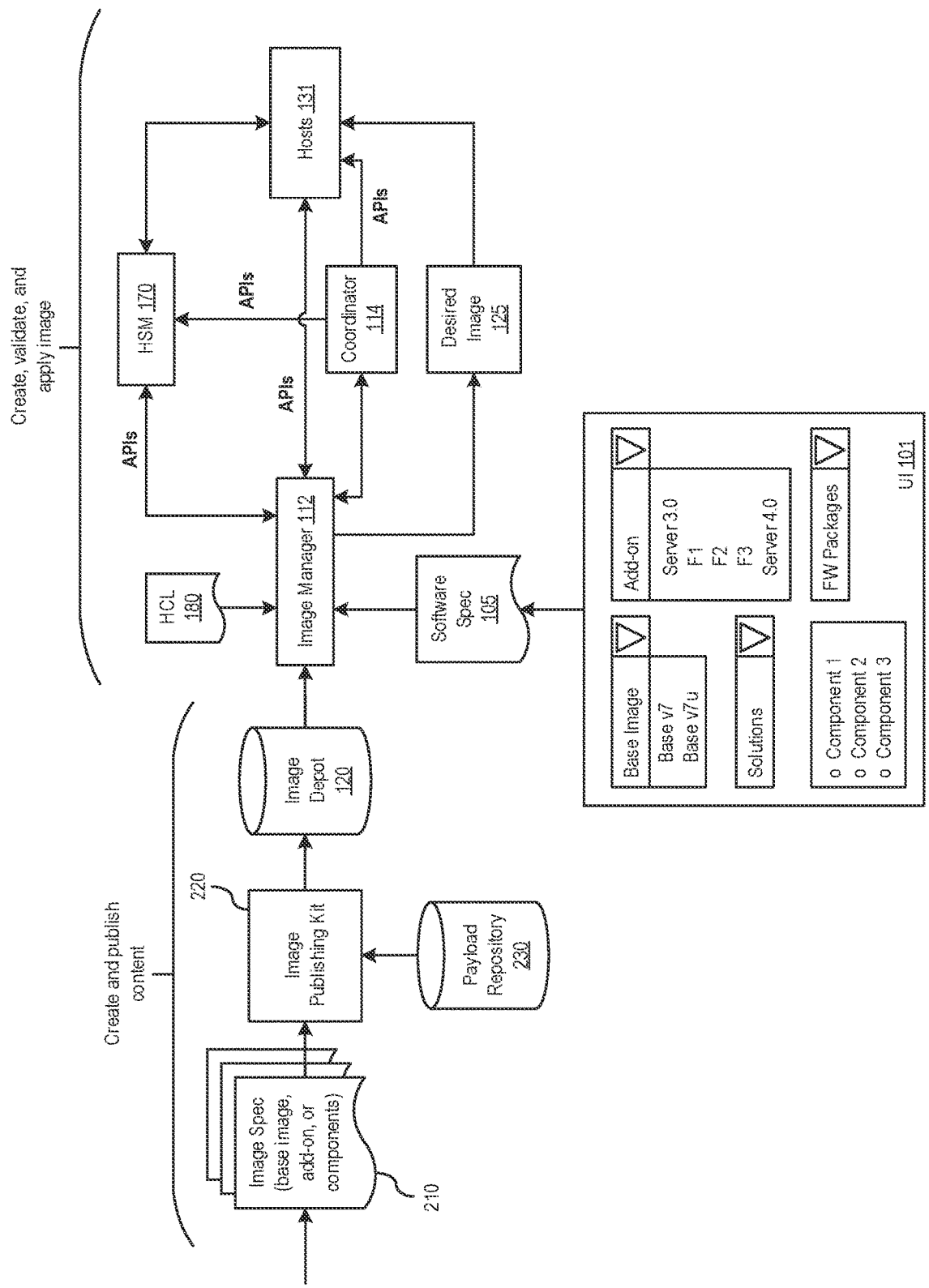
FIG. 2 is a conceptual diagram that illustrates a flow of steps carried out by different components of the virtualized computing system to create and apply a desired image of the virtualization software, according to embodiments.

FIG. 2 is a conceptual diagram that illustrates a flow of steps carried out by different components of the virtualized computing system to create and apply a desired image of the virtualization software, according to embodiments. The first part of FIG. 2 depicts steps for creating content and publishing them in image depot 120. Typically, the creator of the base image is the provider of the virtualization software, e.g., VMware, Inc., and the creator of the add-on is the OEM, which is the provider of the physical servers that are configured as hosts 131. The creator of components may be the provider of the virtualization software, the OEM, or another software developer (e.g., in the case of user components).

Components are defined in an image specification 210 as a collection of payloads, which are stored in payload repository 230, and an image publishing kit 220 pulls in the payloads of the components from payload repository 230 and publishes them in image depot 120 along with the metadata of the published components. Components published in this manner may be a component of a base image, a component of an add-on, a firmware component, a component required to implement a solution, or a user component.

The provider of the virtualization software defines the components that make up the base image in an image specification 210, and image publishing kit 220 publishes the metadata of the base image in image depot 120. In the example depicted in FIG. 1, the metadata of the base image for "Base v7" and the metadata of the base image for "Base v7u" are published in image depot 120.

OEMs define the content of their add-ons in image specifications 210, and image publishing kit 220 publishes the metadata of the add-ons in image depot 120. In the example depicted in FIG. 1, the metadata of add-ons for a family of servers (e.g., F1, F2, and F3 of Server 3.0) are published in image depot 120. OEMs also define the content of firmware components, and image publishing kit 220 publishes the metadata of these components in image depot 120. OEMs also define the content of their firmware packages, in the form of a firmware manifest.

Different solutions and user components are also defined in image specifications 210, and image publishing kit 220 publishes the metadata of each of the different solutions and user components in image depot 120.

The second part of FIG. 2 depicts steps for creating, validating, and applying the desired image. After payloads and metadata of base images, add-ons, firmware components, solutions, and user components have been published in image depot 120, the end user is able to define software specification 105 for the desired image of the virtualization software through UI 101. UI 101 includes different sections for selecting a base image, add-on, solution, firmware package, and one or more user components. Software specification 105 is generated based on the selections the end user makes through UI 101.

After software specification 105 is generated, image manager 112 parses it to determine the selections of the base image, add-on, solution, firmware package, and one or more user components made by the end user. Then, image manager 112 retrieves the metadata corresponding to the selected base image, the selected add-on, and the selected solution from image depot 120, determines the firmware manifest corresponding to the selected firmware package, and composites an image of the virtualization software as a hierarchical software stack, as described above. Image manager 112 then validates the composited image as described below in conjunction with FIG. 4, and commits the validated composited image of the virtualization software as desired image 125 in shared storage 160.

Figure 3:
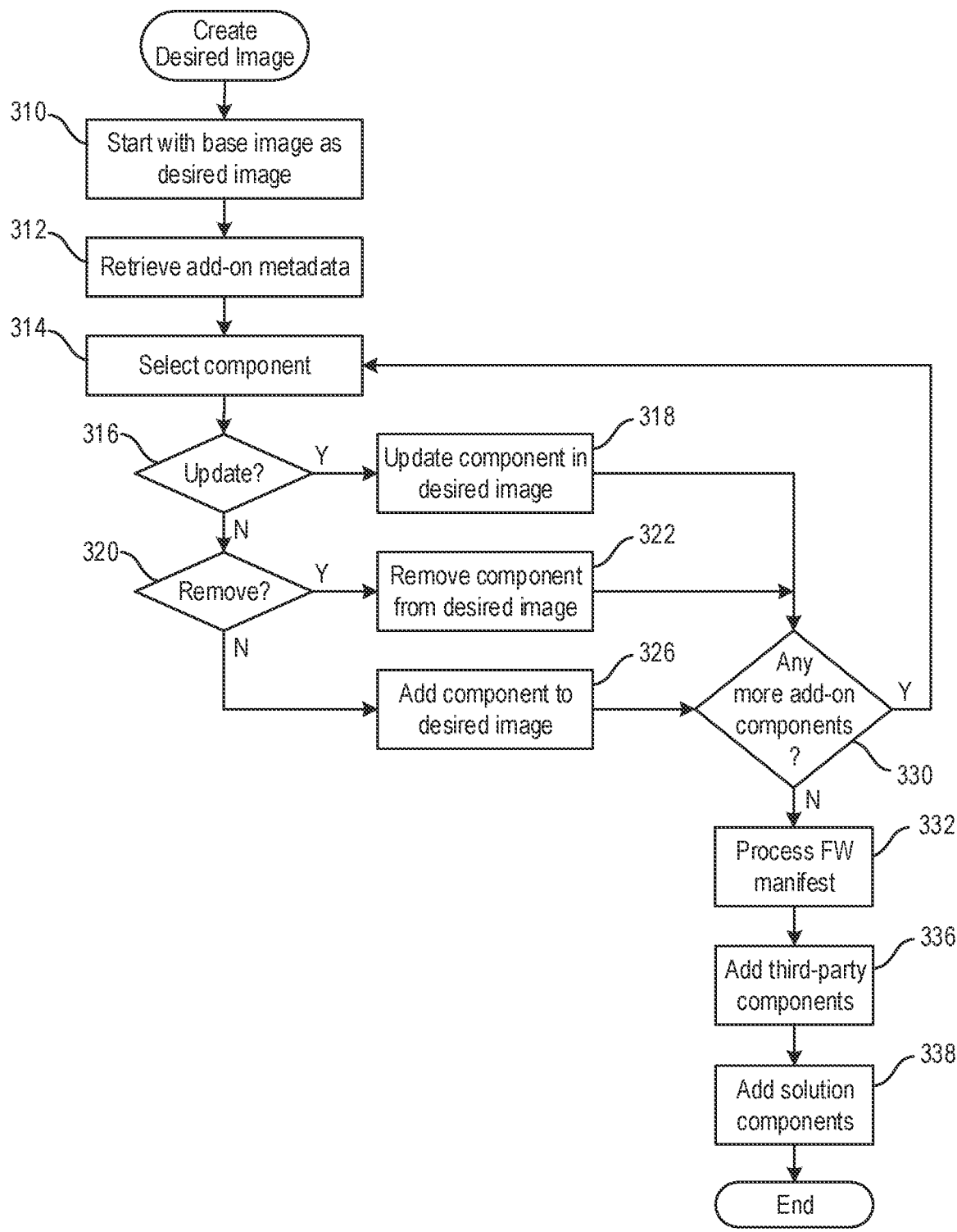
FIG. 3 is a flow diagram of steps carried out to create the desired image of the virtualization software, according to an embodiment.

FIG. 3 is a flow diagram of steps carried out by image manager 112 to create the desired image of the virtualization software, according to an embodiment. The method of FIG. 3 begins at step 310, where image manager 310 starts with the metadata of the selected base image as the desired image. Then, at step 312, image manager 310 retrieves the metadata of the selected add-on and parses the metadata of the selected add-on for components.

At step 314, image manager 112 selects a component to process. If the component is to be updated as determined at step 316, image manager 112 updates the metadata of the component in the desired image at step 318. If the component is to be removed as determined at step 320, image manager 112 removes the metadata of the component from the desired image at step 322. If the component is to be neither updated nor removed, it is added to the desired image at step 326. If there are any more add-on components to process, as determined at step 330, the process returns to step 314, where another component is selected for processing.

If there are no more add-on components to process, as determined at step 330, image manager 112 at step 332 processes the firmware manifest corresponding to the selected firmware package to add and remove components in the same manner as the selected add-on was processed. Then, image manager 112 adds to the desired image and one or more user components selected by the user at step 336 and components for the selected solution at step 338.

FIG. 4 is a flow diagram of steps carried out by image manager 112 to perform validation of the desired image, according to an embodiment. The method of FIG. 4 begins at step 410 at which image manager 112 retrieves metadata of all payloads in the desired image. Then, at step 412, image manager 112 parses the retrieved metadata to extract all dependencies and conflicts defined therein. Image manager 112 executes steps 414 and 416 to determine if any dependencies or conflicts are violated by the payloads that make up the desired image. If there are no such violations, the desired image is committed at step 418 as stored in shared storage 160 as desired image 125. On the other hand, if there is any violation, an error is returned at step 420.

Figure 5:
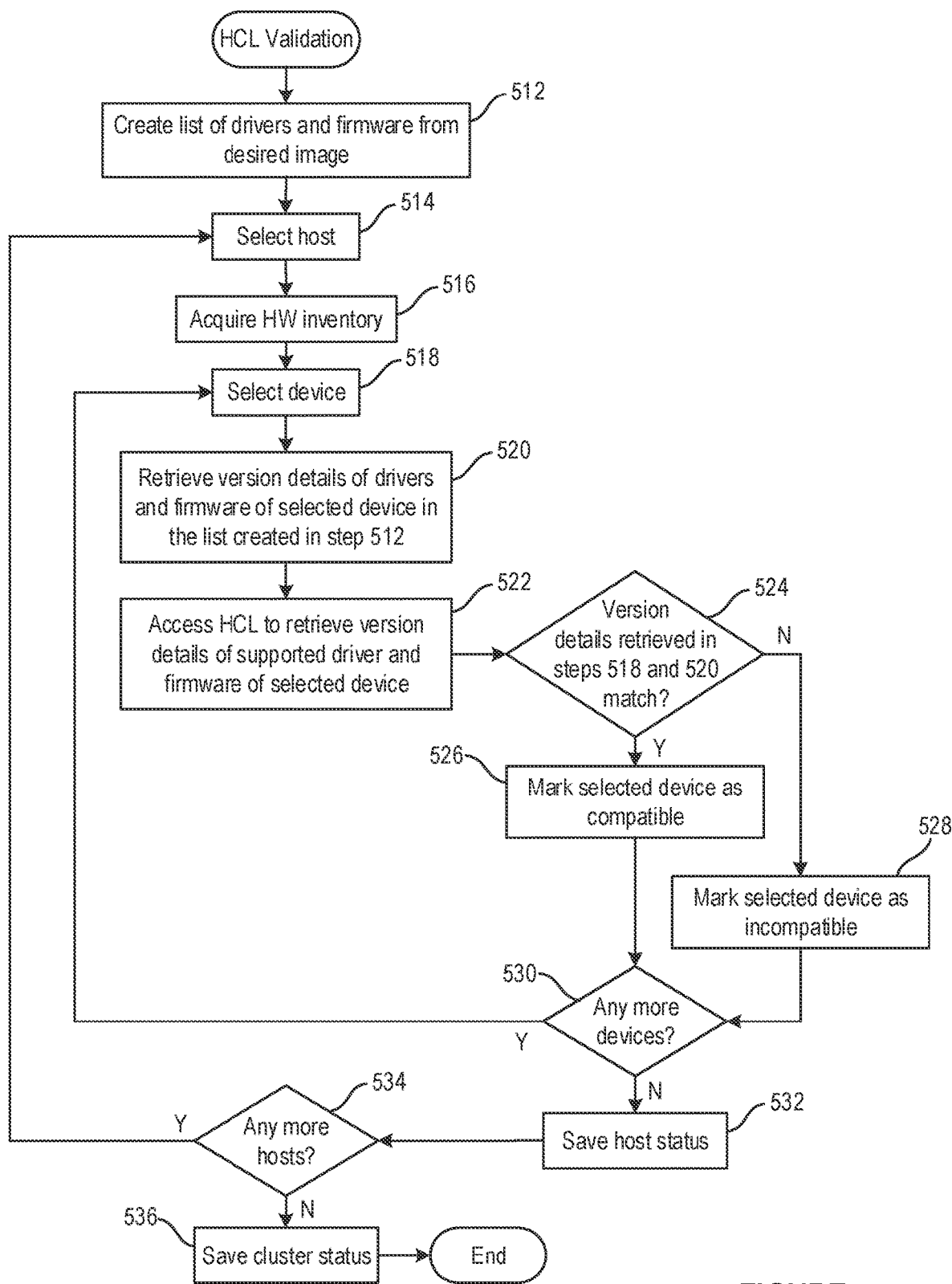
FIG. 5 is a flow diagram of steps carried out to perform validation against a hardware compatibility list, according to an embodiment.

FIG. 5 is a flow diagram of steps carried out by image manager 112 to perform validation of the desired image of the virtualization software against HCL 180, according to an embodiment. The method of FIG. 5 begins at step 512 at which image manager 112 creates a list of firmware and drivers that are in desired image 125, along with their version numbers. At step 514, image manager 112 selects a host against which HCL validation is performed. Steps 516, 518, 520, 522, 524, 526, 528, 530, 532, and 534 are executed each time a new host is selected at step 514.

At step 516, image manager 112 acquires the hardware inventory of the host, e.g., from a hardware discovery service that is running in VM management server 100 and from hardware support manager 170 through a host inventory API. Then, at step 518, image manager 112 selects a unique device in the hardware inventory. Steps 520, 522, 524, 526, 528, and 530 are executed each time a new unique device is selected at step 518. At step 520, image manager 112 retrieves version details of drivers and firmware of the selected device in the list created at step 512. Then, at step 522, image manager 112 accesses HCL 180 to retrieve version details of supported driver and firmware of the selected device. The version details of the drivers and firmware retrieved at step 520 and the version details of the drivers and firmware retrieved at step 522 are then compared at step 524. If there is a match, i.e., the version details of the drivers and firmware retrieved at step 520 can be found in the version details of the drivers and firmware retrieved at step 522, the selected device is marked as compatible at step 526. On the other hand, if there is no match, i.e., the version details of the drivers and firmware retrieved at step 520 cannot be found in the version details of the drivers and firmware retrieved at step 522, the selected device is marked as incompatible at step 528.

If it is determined at step 530 that there is another unique device in the hardware inventory, the process returns to step 518, where image manager 112 selects the next unique device in the hardware inventory. If it is determined at step 530 that there is no other unique device in the hardware inventory, the process proceeds to step 532, at which image manager 112 saves the status for the selected host. If any of the devices were marked as incompatible at step 528, the selected host is marked as incompatible at step 532. If all of the devices were marked as compatible at step 528, the selected host is marked as compatible at step 532.

At step 532, if it is determined that HCL validation has not been carried out for all of hosts 131, the process returns to step 514, where image manager 112 selects the next host for HCL validation. If not, the process proceeds to step 536, at which image manager reads the status of all the hosts in the cluster and saves the status for the entire cluster. If any of the hosts of the cluster were marked as incompatible at step 532, the cluster is marked as incompatible at step 536. If all of the hosts of the cluster were marked as compatible at step 532, the cluster is marked as compatible at step 536. After step 536, the process ends.

Figure 6:
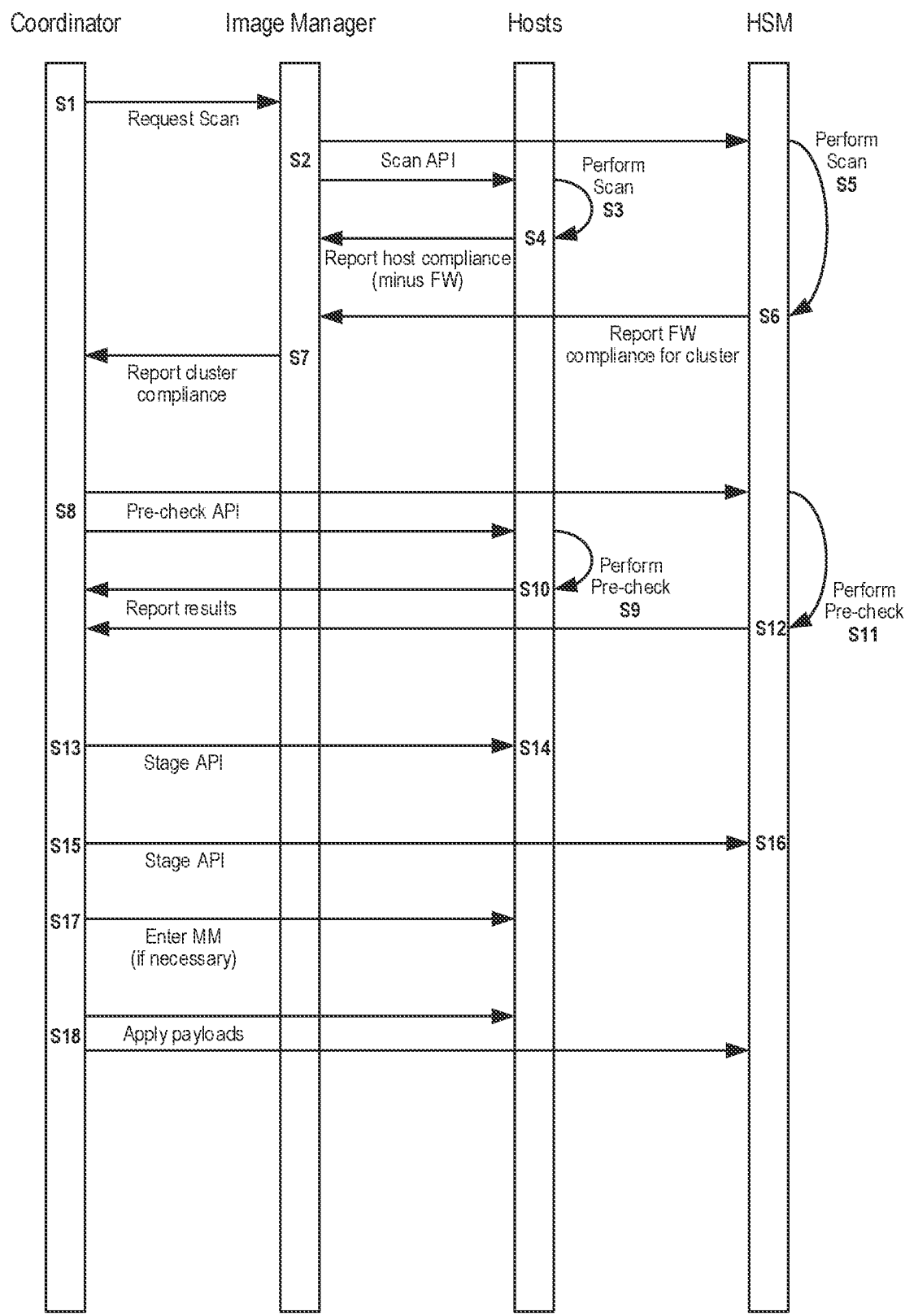
FIG. 6 is a command sequence diagram that depicts a process for applying the desired image of the virtualization software to hosts of the virtualized computing system.

After desired image 125 is validated, committed, and stored in shared storage 160 and after it passes HCL validation, desired image 125 can be applied to hosts 131. Referring back to FIG. 2, image manager 112 transfers control for applying desired image 125 to coordinator 114. The process for applying desired image 125 is depicted in FIG. 6. FIG. 6 is a command sequence diagram that depicts a process for applying the desired image of the virtualization software to hosts of the virtualized computing system. The process includes the following subprocesses: (1) scan, (2) pre-check, (3) stage, and (4) apply.

The scan subprocess is represented by steps S1 to S7. Coordinator 114 initiates the scan subprocess by making the request to image manager 112 at step S1. In response, image manager 112 at step S2 issues a scan API to image manager 152 of each host 131 and a scan API to hardware support manager 170. The scan API includes a storage location of desired image 125.

In response to the scan API, image manager 152 at step S3, accesses desired image 125 and retrieves the current state of the virtualization software from image database 153, and compares the two to determine if each item of desired image 125 other than the firmware manifest is "incompatible" (which means that desired image 125 cannot be applied, e.g., when the current state is running a higher version of an item), "compliant" (which means that the current state matches the desired state), non-compliant (which means that the current state can be upgraded to the desired state), or unknown (which means that a comparison of the current state could not be made with the item in desired image 125 because the item in desired image 125 is unknown or not recognizable). At step S4, image manager 152 of each host 131 sends back a compliance report indicating one of four aforementioned compliance states, and for each item that is non-compliant, also reports on the impact on the host to which desired image 125 will be applied, i.e., whether the host needs to enter into a maintenance mode or needs to be rebooted.

In response to the scan API, hardware support manager 170 at step S5, accesses desired image 125 to extract the firmware manifest in desired image 125, and for each host 131, determines whether or not the firmware specified by the firmware manifest is incompatible, compliant, non-compliant, or unknown with respect to the firmware currently installed in each host 131. It should be noted that versions of the firmware currently installed in each host 131 are made available to image manager 112 in response to the scan API or the host inventory API. At step S6, hardware support manager 170 prepares a firmware compliance report per host, and sends back the firmware compliance report per host to image manager 112. The firmware compliance report per host indicates "incompatible" if the host has installed therein firmware that is of a higher version that that specified by the firmware manifest, "compliant" if the host has installed therein the firmware specified by the firmware manifest, "non-compliant" if the host has installed therein firmware that is of a lower version than that specified by the firmware manifest, or "unknown" if the firmware manifest specifies firmware that is either unknown or not recognizable. If the compliance state is "non-compliant" for any host, the firmware compliance report for that host also indicates the impact on the host, i.e., whether the host needs to enter into a maintenance mode or needs to be rebooted. In cases where hardware support manager 170 supports downgrading of the firmware, the firmware compliance report will indicate "non-compliant" instead of "incompatible" if the host has installed therein firmware that is of a higher version that that specified by the firmware manifest.

Upon receipt of the compliance reports, image manager 112 prepares a per-host compliance report based on the compliance report sent from the host at step S4 and firmware compliance reports sent from hardware support manager 170 at step S6. Then, image manager 112 generates a cluster level compliance report based on all of the per-host compliance reports from hosts 131 and the firmware compliance reports sent from hardware support manager 170. At step S7, image manager 112 sends back both the per-host compliance report (which also indicates the impact on the host), and the cluster level compliance report to coordinator 114.

The pre-check subprocess is represented by steps S8 to S12. Coordinator 114 at step S8 issues a pre-check API to image manager 152 of each host 131 and to hardware support manager 170. In response to the pre-check API, image manager 152 of each host 131 at step S9 accesses desired image 125 and retrieves the current state of the virtualization software from image database 153, and compares the two to determine whether or not the virtualization software in the host is compliant or can be upgraded to desired image 125 at that time, and performs several other checks on the host and at step S10 sends the results of the checks to coordinator 114. The other checks include whether or not the host can enter into maintenance mode at that time and a check on the operational health of the host. Similarly, in response to the pre-check API, hardware support manager 170 at step S11 performs a check on each host 131 to determine whether or not the firmware in the host is compliant or can be upgraded to the firmware specified by the firmware manifest in desired image 125 at that time, and at step S12 sends the results of this check to coordinator 114. A pre-check might fail for firmware if higher versions of firmware are already installed, or if the combination of drivers in the image and the firmware specified by the firmware manifest would be incompatible (e.g. if the end user overrode a component in a way that is incompatible with the firmware specified by the firmware manifest). There may also be hardware-specific reasons the firmware specified by the firmware manifest cannot be applied (e.g., defects in system that need repair, lack of resources for the firmware in baseboard management controller 154, etc.)

Coordinator 114 determines whether or not to proceed with the application of desired image 125 to hosts 131 based on the results of the pre-check. For example, if the operational health of one of the hosts 131 is bad, coordinator 114 will not proceed with the application of desired image 125 to hosts 131. Upon determining to proceed with the application of desired image 125 to hosts 131, coordinator 114 executes the stage subprocess.

The stage subprocess is represented by steps S13 to S16. Coordinator 114 at step S13 issues a stage API to image manager 152 of each host 131, and at step S15 issues a stage API to hardware support manager 170. In response, image manager 152 at step S14 pulls in the payloads of desired image 125 from the storage location of desired image 125 and caches them in local memory or cache of the host. At step S16, hardware support manager 170 pulls in payloads of the firmware specified by the firmware manifest in desired image 125 from firmware repository 171 and caches them in local memory or cache of the host.

After staging the payloads, coordinator 114 at step S17 instructs each host 131 to enter into maintenance mode if the cluster compliance report indicates that the maintenance mode is required to bring hosts 131 into compliance. In response to such an instruction (if issued), hosts 131 enter into maintenance mode.

The apply subprocess follows step S17. This subprocess is represented by S18. At step S18, coordinator 114 issues an apply API to each host 131 and hardware support manager 170. This API causes image manager 152 of each host 131 to update the current state of the virtualization software with the payloads of desired image 125 staged at step S14 and hardware support manager 170 to update the current state of the firmware with the payloads of the firmware staged at step S16. More particularly, the order of the updates is as follows: (1) hardware support manager 170 updates the firmware before the virtualization software is updated; (2) each host 131 updates the virtualization software and is rebooted if the cluster compliance report indicates that hosts 131 are required to be rebooted to bring the virtualization software in the host and the associated firmware into compliance; and (3) hardware support manager 170 updates the firmware that needs to be upgraded as a result of the updates to the virtualization software. Also, at step S18, image manager 152 updates metadata of the virtualization software that is stored in image database 153 to reflect that the virtualization software in the host and the associated firmware have been updated to be compliant with desired image 125.

Figure 7:
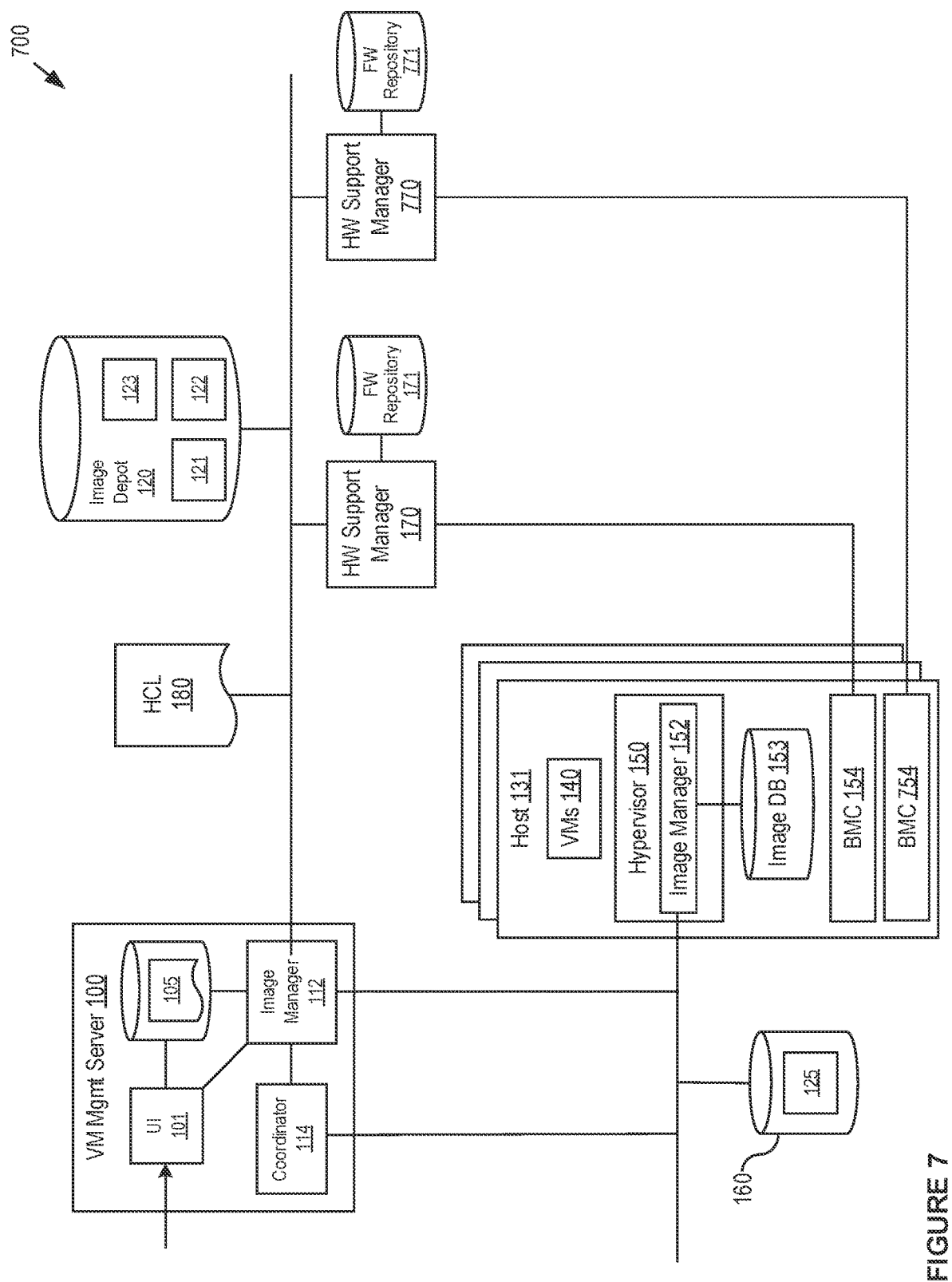
FIG. 7 is a block diagram of another virtualized computing system that implements a desired state model for managing the lifecycle of virtualization software according to embodiments.

FIG. 7 is a block diagram of a virtualized computing system 700 that implements a desired state model for managing the lifecycle of virtualization software according to embodiments. Elements of the virtualized computing system that are common between system 10 and system 700 are referred to using the same reference numbers and descriptions of these common elements are not repeated in the description of system 700 below.

In system 700, the hardware components of hosts 131 are heterogenous and each host 131 includes different baseboard management controllers (BMCs) for installing firmware for the hardware components in hosts 131. They are identified in FIG. 7 as BMC 154 and BMC 754. The firmware installed by BMC 154 is staged in the host by hardware support manager 170 as described above, and the firmware installed by BMC 754 is staged in the host by hardware support manager 770, which is a firmware management software running in a physical or a virtual server, and retrieves firmware to be installed in hosts 131 from firmware repository 771. Hardware support manager 770 differs from hardware support manager 170 in the hardware that it supports. For example, hardware support manager 170 supports standard server hardware, e.g., central processing units (CPUs), memory, network interface controllers, and storage interface circuits, and hardware support manager 770 supports specialized server hardware, e.g., a graphics processing unit (GPU).

Figure 8:
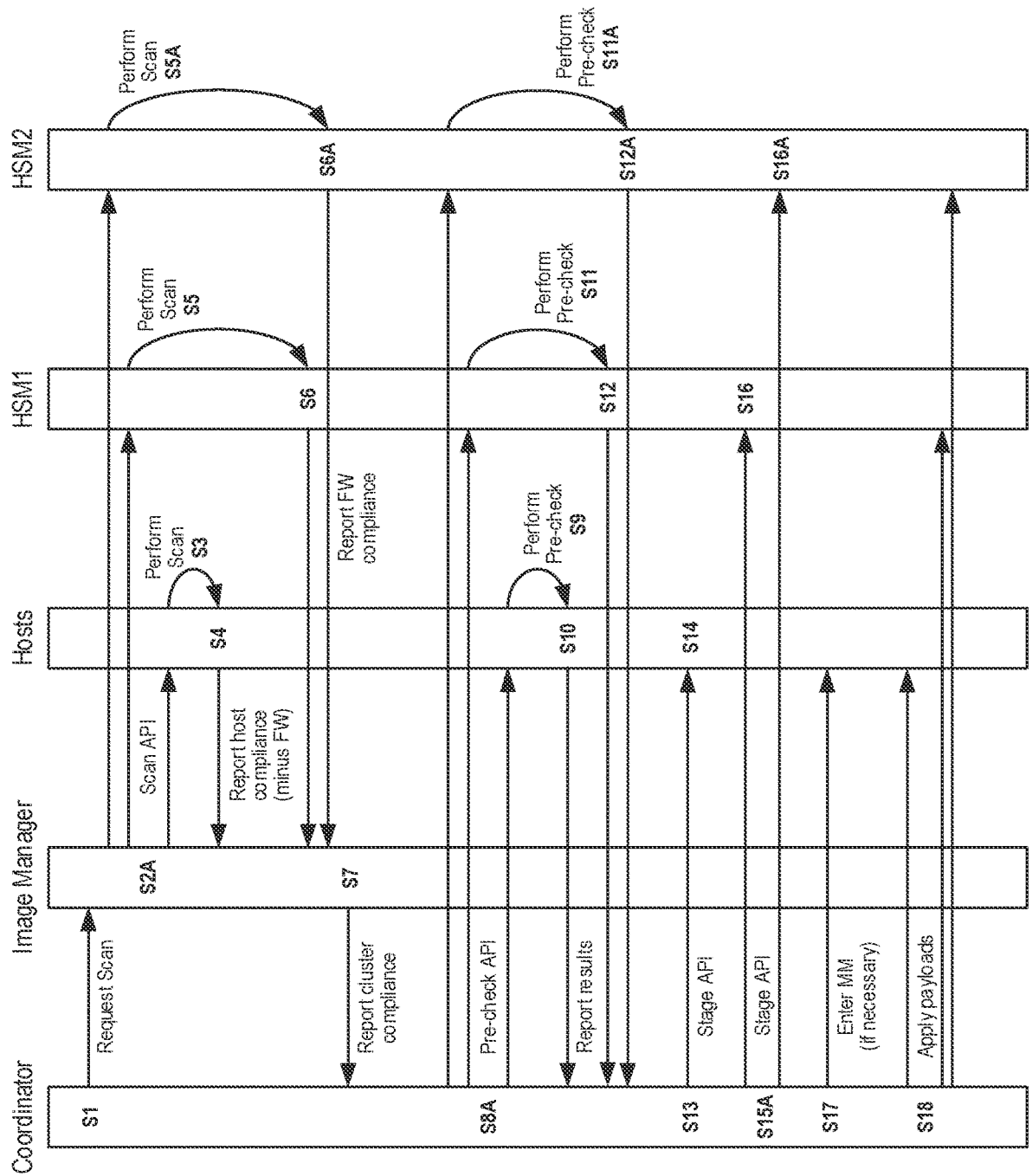
FIG. 8 is a command sequence diagram that depicts a process for applying the desired image of the virtualization software to hosts of the virtualized computing system of FIG. 7.

The process for applying desired image 125 in system 700 is depicted in FIG. 8. FIG. 8 is a command sequence diagram that depicts a process for applying desired image 125 of the virtualization software to hosts 131 of virtualized computing system 700. The process includes the following subprocesses: (1) scan, (2) pre-check, (3) stage, and (4) apply.

The scan subprocess is represented by steps S1 to S7. Coordinator 114 initiates the scan subprocess by making the request to image manager 112 at step S1. In response, image manager 112 at step S2A issues a scan API to image manager 152 of each host 131, and a scan API to hardware support managers 170, 770. The scan API includes a storage location of desired image 125.

In response to the scan API, image manager 152 at step S3, accesses desired image 125 and retrieves the current state of the virtualization software from image database 153, and compares the two to determine if each item of desired image 125 other than the firmware manifest is incompatible, compliant, non-compliant, or unknown. At step S4, image manager 152 of each host 131 sends back a compliance report indicating one of four aforementioned compliance states, and for each item that is non-compliant, also reports on the impact on the host to which desired image 125 will be applied, i.e., whether the host needs to enter into a maintenance mode or needs to be rebooted.

At step S5, hardware support manager 170, in response to the scan API, accesses desired image 125 to extract the firmware manifest in desired image 125, and for each host 131, determines whether or not the firmware specified by the firmware manifest and installed in each host 131 through BMC 154 is incompatible, compliant, non-compliant, or unknown with respect to the firmware currently installed in each host 131. At step S6, hardware support manager 170 prepares a firmware compliance report per host, and sends back the firmware compliance report per host to image manager 112. If the compliance state is "non-compliant" for any host, the firmware compliance report prepared by hardware support manager 170 for that host also indicates the impact on the host, i.e., whether the host needs to enter into a maintenance mode or needs to be rebooted.

At step S5A, hardware support manager 770, in response to the scan API, accesses desired image 125 to extract the firmware manifest in desired image 125, and for each host 131, determines whether or not the firmware specified by the firmware manifest and installed in each host 131 through BMC 754 is incompatible, compliant, non-compliant, or unknown with respect to the firmware currently installed in each host 131. At step S6A, hardware support manager 770 prepares a firmware compliance report per host, and sends back the firmware compliance report per host to image manager 112. If the compliance state is "non-compliant" for any host, the firmware compliance report prepared by hardware support manager 770 for that host also indicates the impact on the host, i.e., whether the host needs to enter into a maintenance mode or needs to be rebooted.

Upon receipt of the compliance reports, image manager 112 prepares a per-host compliance report based on the compliance report sent from the host at step S4 and firmware compliance reports sent from hardware support manager 170 at step S6 and hardware support manager 770 at step S6A. Then, image manager 112 generates a cluster level compliance report based on all of the per-host compliance reports from hosts 131 and the firmware compliance reports sent from hardware support manager 170 and hardware support manager 770. At step S7, image manager 112 sends back both the per-host compliance report (which also indicates the impact on the host), and the cluster level compliance report to coordinator 114.

The pre-check subprocess is represented by steps S8A to S12A. Coordinator 114 at step S8A issues a pre-check API to image manager 152 of each host 131, to hardware support manager 170, and to hardware support manager 770. In response to the pre-check API, image manager 152 of each host 131 at step S9 accesses desired image 125 and retrieves the current state of the virtualization software from image database 153, and compares the two to determine whether or not the virtualization software in the host is compliant or can be upgraded to desired image 125 at that time, and performs several other checks on the host and at step S10 sends the results of the checks to coordinator 114. The other checks include whether or not the host can enter into maintenance mode at that time and a check on the operational health of the host.

Similarly, in response to the pre-check API, hardware support manager 170 at step S11 performs a check on each host 131 to determine whether or not the firmware installed in the host by BMC 154 is compliant or can be upgraded to the firmware specified by the firmware manifest in desired image 125 at that time, and hardware support manager 770 at step S11A performs a check on each host 131 to determine whether or not the firmware installed in the host by BMC 754 is compliant or can be upgraded to the firmware specified by the firmware manifest in desired image 125 at that time. At steps S12 and S12A, hardware support managers 170, 770 send the results of this check to coordinator 114. A pre-check might fail for firmware if higher versions of firmware are already installed, or if the combination of drivers in the image and the firmware specified by the firmware manifest would be incompatible (e.g. if the end user overrode a component in a way that is incompatible with the firmware specified by the firmware manifest). There may also be hardware-specific reasons the firmware specified by the firmware manifest cannot be applied (e.g., defects in system that need repair, lack of resources for the firmware in BMC 154, 754, etc.)

Coordinator 114 determines whether or not to proceed with the application of desired image 125 to hosts 131 based on the results of the pre-check. For example, if the operational health of one of the hosts 131 is bad, coordinator 114 will not proceed with the application of desired image 125 to hosts 131. Upon determining to proceed with the application of desired image 125 to hosts 131, coordinator 114 executes the stage subprocess.

The stage subprocess is represented by steps S13 to S16A. Coordinator 114 at step S13 issues a stage API to image manager 152 of each host 131, and at step S15A issues a stage API to hardware support manager 170 and hardware support manager 770. In response, image manager 152 at step S14 pulls in the payloads of desired image 125 from the storage location of desired image 125 and caches them in local memory or cache of the host. In addition, hardware support manager 170 at step S16 pulls in payloads of the firmware specified by the firmware manifest in desired image 125 from firmware repository 171 and caches them in local memory or cache of the host, and hardware support manager 770 at step S16A pulls in payloads of the firmware specified by the firmware manifest in desired image 125 from firmware repository 771 and caches them in local memory or cache of the host.

After staging the payloads, coordinator 114 at step S17 instructs each host 131 to enter into maintenance mode if the cluster compliance report indicates that the maintenance mode is required to bring hosts 131 into compliance. In response to such an instruction (if issued), hosts 131 enter into maintenance mode.

The apply subprocess follows step S17. This subprocess is represented by S18. At step S18, coordinator 114 issues an apply API to each host 131, hardware support manager 170, and hardware support manager 770. This API causes image manager 152 of each host 131 to update the current state of the virtualization software with the payloads of desired image 125 staged at step S14 and hardware support managers 170, 770 to update the current state of the firmware with the payloads of the firmware staged at steps S16 and S16A. More particularly, the order of the updates is as follows. (1) hardware support managers 170, 770 update the firmware before the virtualization software is updated; (2) each host 131 updates the virtualization software and is rebooted if the cluster compliance report indicates that hosts 131 are required to be rebooted to bring the virtualization software in the host and the associated firmware into compliance; and (3) hardware support managers 170, 770 update the firmware that needs to be upgraded as a result of the updates to the virtualization software. Also, at step S18, image manager 152 updates metadata of the virtualization software that is stored in image database 153 to reflect that the virtualization software in the host and the associated firmware have been updated to be compliant with desired image 125.

Figure 9:
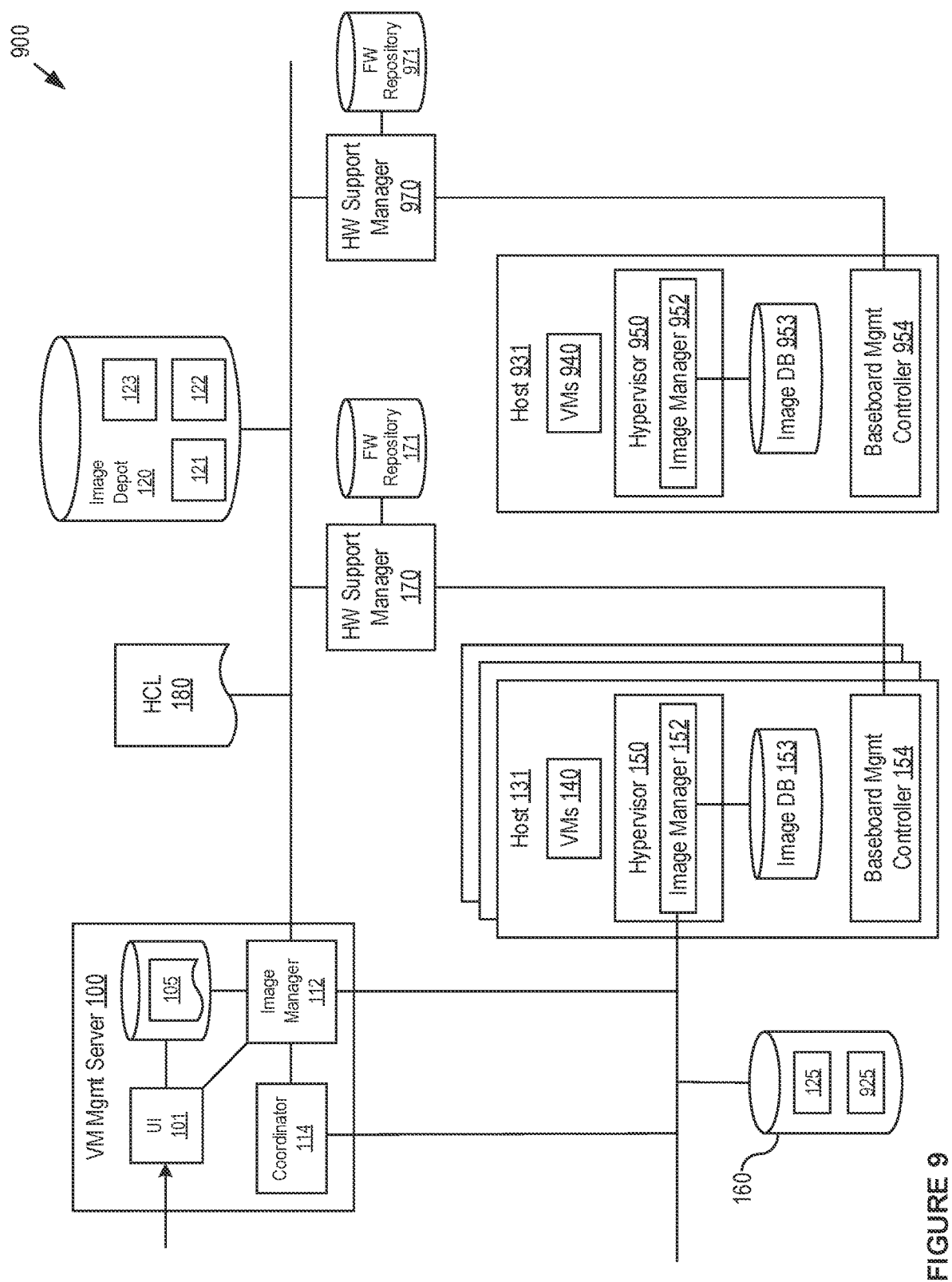
FIG. 9 is a block diagram of still another virtualized computing system that implements a desired state model for managing the lifecycle of virtualization software according to embodiments.

FIG. 9 is a block diagram of a virtualized computing system 900 that implements a desired state model for managing the lifecycle of virtualization software according to embodiments. Elements of the virtualized computing system that are common between system 10 and system 900 are referred to using the same reference numbers and descriptions of these common elements are not repeated in the description of system 900 below.

In system 900, the hosts in the cluster are heterogeneous, and include hosts 131 and host 931. Similar to hosts 131, a virtualization software layer, hypervisor 950, is installed in host 931 to support a virtual machine execution space within which multiple VMs 940 may be concurrently instantiated and executed. The hardware platforms of both hosts 131 and host 931 include standard server hardware, e.g., central processing units (CPUs), memory, network interface controllers, and storage interface circuits, but they are not homogeneous, but heterogeneous, in that they are provided by different vendors or supported by different hardware support managers of the same vendor. In the example of FIG. 9, the hardware platform of each host 131 is supported by hardware support manager 170, and the hardware platform of host 931 is supported by hardware support manager 970, which is a firmware management software running in a physical or a virtual server. Hardware support manager 970 retrieves firmware to be installed in host 931 from firmware repository 971, and communicates with a baseboard management controller 954 provided in host 931 to stage and install the firmware in host 931.

For simplicity, only one host 931 is depicted in system 900. However, system 900 may include multiple hosts 931, all of which would be supported by the same hardware support manager, namely hardware support manager 970.

In addition to desired image 125 for hosts 131, image manager 112 composites and validates a desired image 925 for host 931, which is stored in shared storage 160. Coordinator 114 communicates with image manager 952 of host 931 through an API call to install desired image 925 in host 931. Once image manager 952 installs desired image 925, it stores the metadata of the installed image of the virtualization software in image database 953. Going forward, image database 953 of host 931 operates as the single source of truth for the state of the virtualization software configured in that host, and will record any changes to the state of the virtualization software in image database 953.

Figure 10:
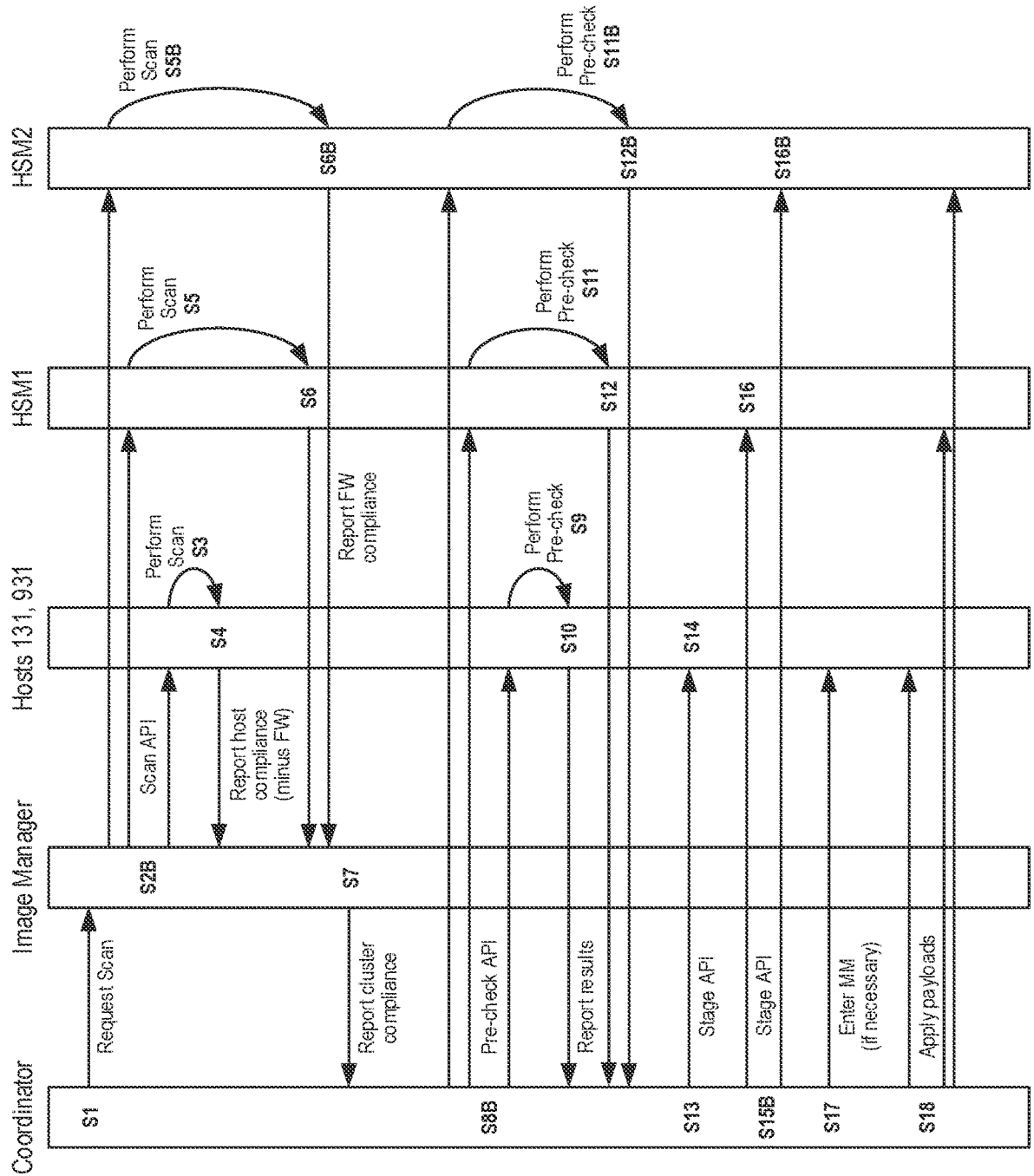
FIG. 10 is a command sequence diagram that depicts a process for applying the desired image of the virtualization software to hosts of the virtualized computing system of FIG. 9.

The process for applying desired image 125 and desired image 925 in system 900 is depicted in FIG. 10. FIG. 10 is a command sequence diagram that depicts a process for applying desired image 125 of the virtualization software to hosts 131 of virtualized computing system 900 and desired image 925 of the virtualization software to host 931 of virtualized computing system 900. The process includes the following subprocesses: (1) scan, (2) pre-check, (3) stage, and (4) apply.

The scan subprocess is represented by steps S1 to S7. Coordinator 114 initiates the scan subprocess by making the request to image manager 112 at step S1. In response, image manager 112 at step S2B issues a scan API to image manager 152 of each host 131 and to image manager 952 of host 931, and a scan API to hardware support managers 170, 970. The scan API issued to image manager 152 of each host 131 includes a storage location of desired image 125, and the scan API issued to image manager 952 of host 931 includes a storage location of desired image 925.

At step S3, image manager 152 of each host 131, in response to the scan API, accesses desired image 125 and retrieves the current state of the virtualization software from image database 153, and compares the two to determine if each item of desired image 125 other than the firmware manifest is incompatible, compliant, non-compliant, or unknown. Also, at step S3, image manager 952 of host 931, in response to the scan API, accesses desired image 925 and retrieves the current state of the virtualization software from image database 953, and compares the two to determine if each item of desired image 925 other than the firmware manifest is incompatible, compliant, non-compliant, or unknown. At step S4, image manager 152 of each host 131 sends back a compliance report indicating one of four aforementioned compliance states, and for each item that is non-compliant, also reports on the impact on the host to which desired image 125 will be applied, i.e., whether the host needs to enter into a maintenance mode or needs to be rebooted. Also, at step S4, image manager 952 of host 931 sends back a compliance report indicating one of four aforementioned compliance states, and for each item that is non-compliant, also reports on the impact on the host to which desired image 925 will be applied, i.e., whether the host needs to enter into a maintenance mode or needs to be rebooted.

At step S5, hardware support manager 170, in response to the scan API, accesses desired image 125 to extract the firmware manifest in desired image 125, and for each host 131, determines whether or not the firmware specified by the firmware manifest and installed in each host 131 through baseboard management controller 154 is incompatible, compliant, non-compliant, or unknown with respect to the firmware currently installed in each host 131. At step S6, hardware support manager 170 prepares a firmware compliance report per host, and sends back the firmware compliance report per host to image manager 112. If the compliance state is "non-compliant" for any host, the firmware compliance report prepared by hardware support manager 170 for that host also indicates the impact on the host, i.e., whether the host needs to enter into a maintenance mode or needs to be rebooted.

At step S5B, hardware support manager 970, in response to the scan API, accesses desired image 925 to extract the firmware manifest in desired image 925, and determines whether or not the firmware specified by the firmware manifest and installed in host 931 through baseboard management controller 954 is incompatible, compliant, non-compliant, or unknown with respect to the firmware currently installed in host 931. At step S6B, hardware support manager 970 prepares a firmware compliance report for the host, and sends back the firmware compliance report per host to image manager 112. If the compliance state is "non-compliant" for the host, the firmware compliance report prepared by hardware support manager 970 also indicates the impact on the host, i.e., whether the host needs to enter into a maintenance mode or needs to be rebooted.

Upon receipt of the compliance reports, image manager 112 prepares a per-host compliance report based on the compliance report sent from the host at step S4 and firmware compliance reports sent from hardware support manager 170 at step S6 and hardware support manager 970 at step S6B. Then, image manager 112 generates a cluster level compliance report based on all of the per-host compliance reports from hosts 131 and the firmware compliance reports sent from hardware support manager 170 and hardware support manager 970. At step S7, image manager 112 sends back both the per-host compliance report (which also indicates the impact on the host), and the cluster level compliance report to coordinator 114.

The pre-check subprocess is represented by steps S8B to S12B. Coordinator 114 at step S8B issues a pre-check API to image manager 152 of each host 131, to hardware support manager 170, and to hardware support manager 970. At step S9, in response to the pre-check API, image manager 152 of each host 131 accesses desired image 125 and retrieves the current state of the virtualization software from image database 153, and compares the two to determine whether or not the virtualization software in the host is compliant or can be upgraded to desired image 125 at that time, and performs several other checks on the host. The other checks include whether or not the host can enter into maintenance mode at that time and a check on the operational health of the host. Also at step S9, in response to the pre-check API, image manager 952 of host 931 accesses desired image 925 and retrieves the current state of the virtualization software from image database 953, and compares the two to determine whether or not the virtualization software in the host is compliant or can be upgraded to desired image 925 at that time, and performs several other checks on the host. At step S10, image manager 152 of each host 131 and image manager 952 of host 931 send the results of the checks to coordinator 114.

Similarly, in response to the pre-check API, hardware support manager 170 at step S11 performs a check on each host 131 to determine whether or not the firmware installed in the host by baseboard management controller 154 is compliant or can be upgraded to the firmware specified by the firmware manifest in desired image 125 at that time, and hardware support manager 970 at step S11B performs a check on host 931 to determine whether or not the firmware installed in the host by baseboard management controller 954 is compliant or can be upgraded to the firmware specified by the firmware manifest in desired image 925 at that time. At steps S12 and S12B, hardware support managers 170, 970 send the results of this check to coordinator 114. A pre-check might fail for firmware if higher versions of firmware are already installed, or if the combination of drivers in the image and the firmware specified by the firmware manifest would be incompatible (e.g. if the end user overrode a component in a way that is incompatible with the firmware specified by the firmware manifest). There may also be hardware-specific reasons the firmware specified by the firmware manifest cannot be applied (e.g., defects in system that need repair, lack of resources for the firmware in baseboard management controllers 154, 954, etc.)

Coordinator 114 determines whether or not to proceed with the application of desired image 125 to hosts 131 and with the application of desired image 925 to host 931 based on the results of the pre-check. For example, if the operational health of one of the hosts 131 is bad, coordinator 114 will not proceed with the application of desired image 125 to hosts 131 or if the operational health of host 931 is bad, coordinator 114 will not proceed with the application of desired image 925 to host 931. Upon determining to proceed with the application of desired image 125 to hosts 131 and with the application of desired image 925 to host 931, coordinator 114 executes the stage subprocess.

The stage subprocess is represented by steps S13 to S16B. Coordinator 114 at step S13 issues a stage API to image manager 152 of each host 131 and to image manager 952 of host 931, and at step S15B issues a stage API to hardware support manager 170 and hardware support manager 970. In response, at step S14, image manager 152 pulls in the payloads of desired image 125 from the storage location of desired image 125 and caches them in local memory or cache of the host, and image manager 952 pulls in the payloads of desired image 925 from the storage location of desired image 925 and caches them in local memory or cache of the host. In addition, hardware support manager 170 at step S16 pulls in payloads of the firmware specified by the firmware manifest in desired image 125 from firmware repository 171 and caches them in local memory or cache of the host, and hardware support manager 970 at step S16B pulls in payloads of the firmware specified by the firmware manifest in desired image 925 from firmware repository 971 and caches them in local memory or cache of the host.

After staging the payloads, coordinator 114 at step S17 instructs each host 131 and host 931 to enter into maintenance mode if the cluster compliance report indicates that the maintenance mode is required to bring the hosts in the cluster into compliance. In response to such an instruction (if issued), hosts 131 and host 931 enter into maintenance mode.

The apply subprocess follows step S17. This subprocess is represented by S18. At step S18, coordinator 114 issues an apply API to each host 131, host 931, hardware support manager 170, and hardware support manager 970. This API causes image manager 152 of each host 131 to update the current state of the virtualization software with the payloads of desired image 125 staged at step S14 and hardware support managers 170 to update the current state of the firmware with the payloads of the firmware staged at step S16. This API also causes image manager 952 of host 931 to update the current state of the virtualization software with the payloads of desired image 925 staged at step S14 and hardware support managers 970 to update the current state of the firmware with the payloads of the firmware staged at step S16B. More particularly, the order of the updates is as follows: (1) hardware support managers 170, 970 update the firmware before the virtualization software is updated, (2) each of hosts 131 and host 931 updates the virtualization software and is rebooted if the cluster compliance report indicates that the host is required to be rebooted to bring the virtualization software in the host and the associated firmware into compliance; and (3) hardware support managers 170, 970 update the firmware that needs to be upgraded as a result of the updates to the virtualization software. In addition, at step S18, image manager 152 updates metadata of the virtualization software that is stored in image database 153 to reflect that the virtualization software in the host and the associated firmware have been updated to be compliant with desired image 125, and image manager 952 updates metadata of the virtualization software that is stored in image database 953 to reflect that the virtualization software in the host and the associated firmware have been updated to be compliant with desired image 925.

In the embodiments, the end user carries out the processes of FIGS. 6, 8, and 10 to "remediate" the hosts. The remediation process may be executed, in one embodiment, to bring the cluster of hosts back into compliance with the desired state of the virtualization software specified in software specification 105. In another embodiment, the process is carried out to deliver and install a new desired image of the virtualization software that is generated from software specification 105. The processes of FIGS. 6, 8, and 10 each include the scan subprocess, the pre-check subprocess, the stage subprocess, and the apply subprocess, but some of the subprocesses, e.g., the scan subprocess and the pre-check subprocess, may be executed on its own, independently of the processes of FIGS. 6, 8, and 10.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of upgrading an image of a virtualization software and firmware in a plurality of hosts having hardware that is supported by multiple hardware support managers including first and second hardware support managers, said method comprising:
   in response to a user input, generating a software specification that specifies a desired state of the virtualization software and a desired state of first firmware for first hardware supported by the first hardware support manager and second firmware for second hardware supported by the second hardware support manager;

based on the software specification, preparing a desired image of the virtualization software that includes software components of the desired state of the first firmware and the desired state of the second firmware; and from a virtual machine management server that is programmed to deploy virtual machines in the hosts, coordinating an upgrade to the desired state of the virtualization software and the desired state of the first and second firmware in the hosts by (1) instructing the first hardware support manager and the second hardware support manager to upgrade the hosts to the desired state of the first firmware and the desired state of the second firmware, respectively, and (2) instructing each of the hosts to upgrade to the desired image of the virtualization software.

2. The method of claim 1, wherein at least one of the hosts includes the first hardware supported by the first hardware support manager and the second hardware supported by the second hardware support manager.

3. The method of claim 2, wherein the first hardware includes standard server hardware and the second hardware includes specialized server hardware.

4. The method of claim 3, wherein the specialized server hardware includes a graphics processing unit.

5. The method of claim 4, wherein each of the first and second hardware support managers exposes a set of APIs to be called by the virtual machine management server, the set of APIs exposed by the first hardware support manager including a first API to upgrade the first firmware to the desired state of the first firmware and the set of APIs exposed by the second hardware support manager including a second API to upgrade the second firmware to the desired state of the second firmware.

6. The method of claim 1, wherein the plurality of hosts include:
a first host including the first hardware and not the second hardware; and
a second host including the second hardware and not the first hardware.

7. The method of claim 6, wherein the first hardware includes standard server hardware and the second hardware includes standard server hardware.

8. The method of claim 7, wherein each of the first and second hardware support managers exposes a set of APIs to be called by the virtual machine management server, the set of APIs exposed by the first hardware support manager including a first API to upgrade the first firmware to the desired state of the first firmware and the set of APIs exposed by the second hardware support manager including a second API to upgrade the second firmware to the desired state of the second firmware.

9. The method of claim 1, wherein the software components of the desired state of the first firmware and the desired state of the second firmware include a first driver corresponding to the desired state of the first firmware and a second driver corresponding to the desired state of the second firmware.

10. A computer system comprising a management server, a cluster of hosts in which virtualization software and firmware are to be upgraded, multiple hardware support managers including a first hardware support manager for supporting firmware upgrades in the hosts, and a second hardware support manager for supporting firmware upgrades in the hosts, wherein the management server is programmed to execute a method of upgrading an image of the virtualization software and the firmware in the hosts, said method comprising:

in response to a user input, generating a software specification that specifies a desired state of the virtualization software and a desired state of first firmware for first hardware supported by the first hardware support manager and second firmware for second hardware supported by the second hardware support manager;

based on the software specification, preparing a desired image of the virtualization software that includes software components of the desired state of the first firmware and the desired state of the second firmware; and coordinating an upgrade to the desired state of the virtualization software and the desired state of the first and second firmware in the hosts by (1) instructing the first hardware support manager and the second hardware support manager to upgrade the hosts to the desired state of the first firmware and the desired state of the second firmware, respectively, and (2) instructing each of the hosts to upgrade to the desired image of the virtualization software.

11. The computer system of claim 10, wherein at least one of the hosts includes the first hardware supported by the first hardware support manager and the second hardware supported by the second hardware support manager.

12. The computer system of claim 11, wherein the first hardware includes standard server hardware and the second hardware includes specialized server hardware.

13. The computer system of claim 12, wherein the specialized server hardware includes a graphics processing unit.

14. The computer system of claim 13, wherein each of the first and second hardware support managers exposes a set of APIs to be called by the management server, the set of APIs exposed by the first hardware support manager including a first API to upgrade the first firmware to the desired state of the first firmware and the set of APIs exposed by the second hardware support manager including a second API to upgrade the second firmware to the desired state of the second firmware.

15. The computer system of claim 10, wherein the plurality of hosts include:
a first host including the first hardware and not the second hardware; and
a second host including the second hardware and not the first hardware.

16. The computer system of claim 15, wherein the first hardware includes standard server hardware and the second hardware includes standard server hardware.

17. The computer system of claim 16, wherein each of the first and second hardware support managers exposes a set of APIs to be called by the management server, the set of APIs exposed by the first hardware support manager including a first API to upgrade the first firmware to the desired state of the first firmware and the set of APIs exposed by the second hardware support manager including a second API to upgrade the second firmware to the desired state of the second firmware.

18. The computer system of claim 10, wherein the software components of the desired state of the first firmware and the desired state of the second firmware include a first driver corresponding to the desired state of the first firmware and a second driver corresponding to the desired state of the second firmware.

19. A non-transitory computer readable medium comprising instructions that are executable in a processor for the processor to carry out a method of upgrading an image of a virtualization software and firmware in a plurality of hosts having hardware that is supported by multiple hardware support managers including first and second hardware support managers, said method comprising:

in response to a user input, generating a software specification that specifies a desired state of the virtualization software and a desired state of first firmware for first hardware supported by the first hardware support manager and second firmware for second hardware supported by the second hardware support manager;

based on the software specification, preparing a desired image of the virtualization software that includes software components of the desired state of the first firmware and the desired state of the second firmware; and coordinating an upgrade to the desired state of the virtualization software and the desired state of the first and second firmware in the hosts by (1) instructing the first hardware support manager and the second hardware support manager to upgrade the hosts to the desired state of the first firmware and the desired state of the second firmware, respectively, and (2) instructing each of the hosts to upgrade to the desired image of the virtualization software.

20. The non-transitory computer readable medium of claim 19, wherein the software components of the desired state of the first firmware and the desired state of the second firmware include a first driver corresponding to the desired state of the first firmware and a second driver corresponding to the desired state of the second firmware.

\* \* \* \* \*